United States Patent
Sim

(10) Patent No.: US 10,446,152 B2
(45) Date of Patent: Oct. 15, 2019

(54) SPEECH RECOGNITION-BASED VEHICLE CONTROL METHOD

(71) Applicants: HYUNDAI MOTOR COMPANY, Seoul (KR); KIA MOTORS CORPORATION, Seoul (KR)

(72) Inventor: HyunChul Sim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 77 days.

(21) Appl. No.: 15/834,678

(22) Filed: Dec. 7, 2017

(65) Prior Publication Data

US 2019/0115017 A1 Apr. 18, 2019

(30) Foreign Application Priority Data

Oct. 13, 2017 (KR) ........................ 10-2017-0133259

(51) Int. Cl.

| | |
|---|---|
| *G06F 3/00* | (2006.01) |
| *G10L 15/22* | (2006.01) |
| *G10L 25/51* | (2013.01) |
| *G06F 3/01* | (2006.01) |
| *H04L 29/06* | (2006.01) |
| *G10L 15/30* | (2013.01) |
| *H04L 29/08* | (2006.01) |

(52) U.S. Cl.
CPC .............. *G10L 15/22* (2013.01); *G06F 3/017* (2013.01); *G10L 25/51* (2013.01); *H04L 63/0853* (2013.01); *G10L 15/30* (2013.01); *G10L 2015/223* (2013.01); *H04L 63/0876* (2013.01); *H04L 67/12* (2013.01)

(58) Field of Classification Search
CPC ......... G10L 15/22; G10L 17/06; G10L 17/22; G10L 15/30; G10L 15/26; H04L 29/06
See application file for complete search history.

(56) References Cited

U.S. PATENT DOCUMENTS

| | | | |
|---|---|---|---|
| 7,529,677 B1 * | 5/2009 | Wittenberg | G10L 15/30 |
| | | | 704/270 |
| 9,728,188 B1 * | 8/2017 | Rosen | G10L 15/22 |
| 10,186,266 B1 * | 1/2019 | Devaraj | G06F 3/167 |
| 2012/0253607 A1 | 10/2012 | Choi | |

(Continued)

FOREIGN PATENT DOCUMENTS

| | | |
|---|---|---|
| JP | 2015-153258 A | 8/2015 |
| KR | 10-2014-0054662 A | 5/2014 |
| KR | 10-2016-0041521 A | 4/2016 |

*Primary Examiner* — Shreyans A Patel

(74) *Attorney, Agent, or Firm* — Morgan, Lewis & Bockius LLP

(57) ABSTRACT

A speech recognition based vehicle control method includes transmitting a speech command to a first server through a first path via a speech recognition service apparatus in response to a generation of the speech command, transmitting authentication data of a portable device and the speech command to the first server through a second path via the portable device in response to the generation of the speech command, and performing, by the first server, authentication of the portable device on the basis of the authentication data, and recognizing the speech command as a valid speech command when the authentication of the portable device is completed.

14 Claims, 5 Drawing Sheets

(56) References Cited

U.S. PATENT DOCUMENTS

| | | | | |
|---|---|---|---|---|
| 2014/0095176 A1* | 4/2014 | Kim | ...................... | H04N 5/4403 704/275 |
| 2015/0081169 A1* | 3/2015 | Pisz | ................... | B60H 1/00657 701/36 |
| 2015/0286813 A1* | 10/2015 | Jakobsson | ............... | G06F 21/35 726/9 |
| 2015/0324168 A1* | 11/2015 | Suzuki | .................... | G10L 15/25 345/156 |
| 2015/0326822 A1* | 11/2015 | Jeong | .................... | H04N 7/147 348/14.03 |
| 2016/0086161 A1* | 3/2016 | Zhou | .................. | G06Q 20/3274 705/44 |
| 2016/0191481 A1* | 6/2016 | Zimmer | .............. | H04L 63/0428 713/168 |
| 2016/0328576 A1* | 11/2016 | Howley | ................... | G06F 19/00 |
| 2017/0083285 A1* | 3/2017 | Meyers | ................. | G10L 15/063 |
| 2017/0108878 A1 | 4/2017 | Krispin | | |
| 2017/0110144 A1* | 4/2017 | Sharifi | ..................... | G10L 17/08 |
| 2018/0007060 A1* | 1/2018 | Leblang | ............... | H04L 63/105 |
| 2018/0068671 A1* | 3/2018 | Fawaz | ................. | G10L 21/0205 |
| 2018/0158060 A1* | 6/2018 | Adams | ................ | G06Q 20/409 |
| 2018/0196510 A1* | 7/2018 | Liu | ....................... | H04W 76/10 |
| 2018/0247645 A1* | 8/2018 | Li | ........................... | G06F 3/167 |
| 2018/0259974 A1* | 9/2018 | Lei | ........................ | H04W 4/44 |
| 2018/0285062 A1* | 10/2018 | Ulaganathan | ............ | G06F 3/167 |
| 2019/0005832 A1* | 1/2019 | Waage Aabel | ......... | G09B 5/065 |
| 2019/0027137 A1* | 1/2019 | Sohn | ....................... | G10L 15/22 |

\* cited by examiner

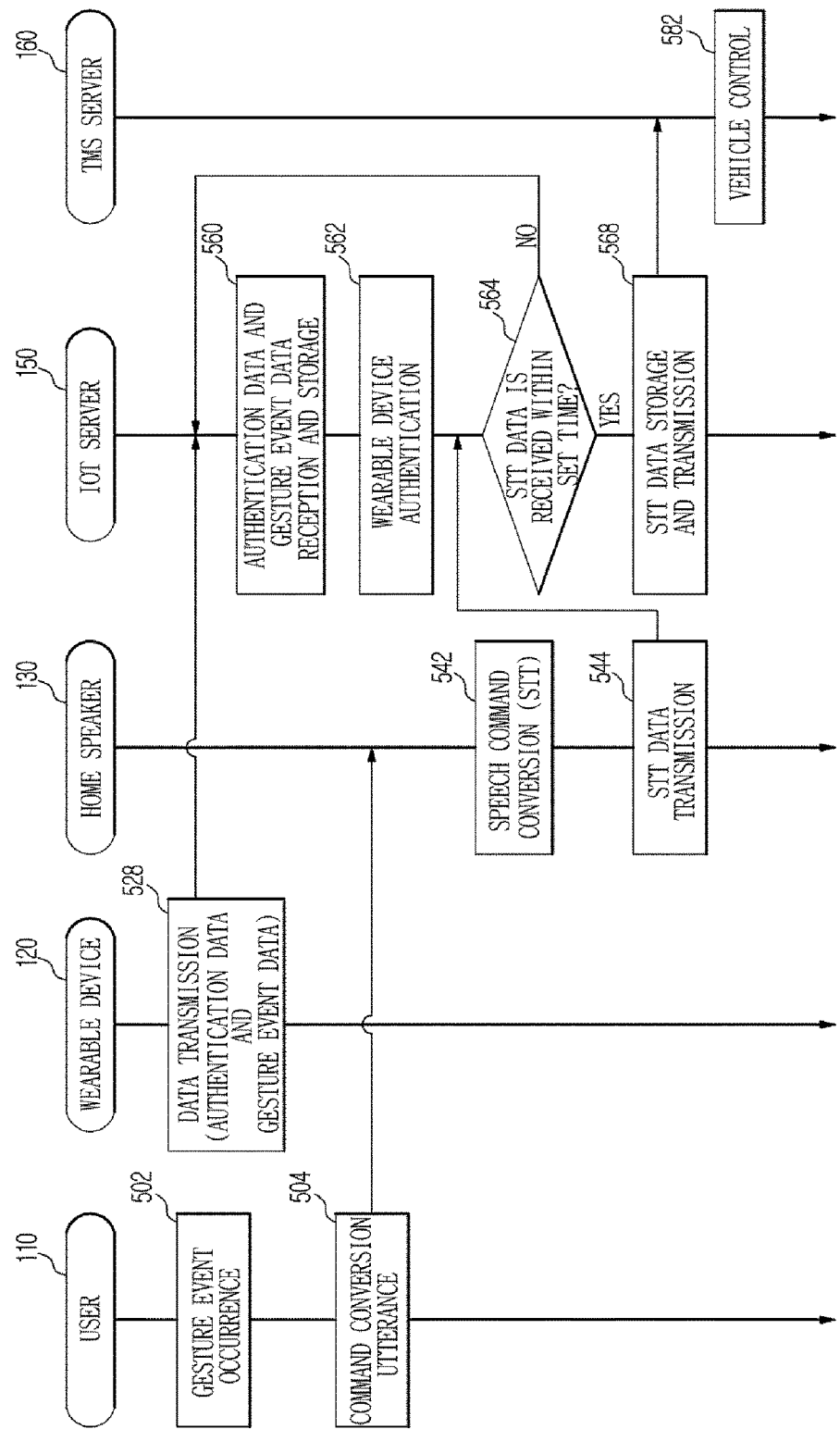

SPEECH RECOGNITION-BASED VEHICLE CONTROL METHOD

CROSS-REFERENCE TO RELATED APPLICATION

This application claims the benefit of priority to Korean Patent Application No. 10-2017-0133259, filed on Oct. 13, 2017 with the Korean Intellectual Property Office, the entire disclosure of which is incorporated herein by reference.

TECHNICAL FIELD

Embodiments of the present disclosure relate to a vehicle, and more particularly, to speech recognition-based vehicle control method.

BACKGROUND

As speech recognition technology is developed, use of a speech recognition secretarial service which recognizes a speech command generated by a user and executes a corresponding command is being significantly increased. An application scope of the speech recognition secretarial service is expanding from a home application to applications to various fields such as vehicles and the like. That is, in conjunction with speech recognition secretarial service and a telematics service, a speech command generated by a user is transmitted to a vehicle to control the vehicle. Accordingly, the user can lock or unlock a door of the vehicle, or turn on an air conditioner of the vehicle in advance and control a temperature inside the vehicle, among other functions.

In order to use the speech recognition secretarial service as described above, user authentication is required. This is because when user authentication is not performed, an unauthorized person may use a vehicle without permission. In a conventional user authentication method, for example, a password (e.g., a personal identification number (PIN) code) is spoken so that a home speaker 130 can recognize the spoken password. However, such user authentication through a direct production of a password is risky because the password can be exposed to others.

SUMMARY

Therefore, it is an aspect of the present disclosure to provide a speech recognition-based vehicle control method in which user authentication is privately performed through a portable device (e.g., a wearable device) of a user without directly speaking information for authentication (e.g., a password or a personal identification number (PIN) code) in a speech form so that security when the user authentication is performed is sufficiently ensured.

Additional aspects of the disclosure will be set forth in part in the description which follows and, in part, will be obvious from the description, or may be learned by practice of the disclosure.

In accordance with one aspect of the present disclosure, a speech recognition based vehicle control method includes transmitting a speech command to a first server through a first path via a speech recognition service apparatus in response to a generation of the speech command, transmitting authentication data of a portable device and the speech command to the first server through a second path via the portable device in response to the generation of the speech command, and performing, by the first server, authentication of the portable device on the basis of the authentication data, and recognizing the speech command as a valid speech command when the authentication of the portable device is completed.

The speech recognition based vehicle control method may further include comparing the speech command transmitted through the first path and the speech command transmitted through the second path to determine validity of the speech command and determining whether the speech commands are identical.

The speech recognition based vehicle control method may further include transmitting the speech command to the second server when the speech command is determined to be valid so that control corresponding to the speech command is performed.

The second server may be a telematics server, and the control through the speech command may be for controlling a vehicle registered in the telematics server.

The speech recognition service apparatus may be an Internet of things (IoT) device configured to provide a speech recognition secretarial service.

The portable device may be a wearable device having at least one function of speech input and gesture recognition.

In accordance with another aspect of the present disclosure, a speech recognition based vehicle control method includes detecting a gesture event in a portable device, transmitting a speech command to a first server through a first path via a speech recognition service apparatus in response to occurrence of the gesture event, transmitting authentication data of the portable device and gesture event data to the first server through a second path via the portable device in response to the occurrence of the gesture event, and performing, by the first server, authentication of the portable device on the basis of the authentication data and recognizing the speech command as a valid speech command when the authentication of the portable device is completed.

Only a speech signal input within a preset time after the occurrence of the gesture event may be recognized as a speech command.

A motion of a part of a body of a user of the portable device may be sensed through a motion sensor to detect that the gesture event occurs.

The motion sensor may be at least one of a gyro sensor, a vision sensor, and an optical sensor, which are provided to sense the motion of the part of the body of the user.

The speech recognition based vehicle control method may further include transmitting the speech command to the second server when the speech command is determined to be valid so that control corresponding to the speech command is performed.

The second server may be a telematics server, and the control through the speech command may be for controlling a vehicle registered in the telematics server.

The speech recognition service apparatus may be an IoT device configured to provide a speech recognition secretarial service.

The portable device may be a wearable device having at least one function of speech input and gesture recognition.

In accordance with still another aspect of the present disclosure, a speech recognition based vehicle control method includes transmitting a speech command to a first server through a first path via a speech recognition service apparatus, transmitting authentication data of a portable device to the first server through a second path via the portable device, and performing, by the first server, authentication of the portable device on the basis of the authentication data, and determining validity of the speech command according to a result of the authentication of the portable device.

The speech recognition based vehicle control method may further include transmitting the speech command to the second server when the speech command is determined to be valid so that control corresponding to the speech command is performed.

The second server may be a telematics server, and the control through the speech command may be for controlling a vehicle registered in the telematics server.

The speech recognition service apparatus may be an IoT device configured to provide a speech recognition secretarial service.

The portable device may be a wearable device having at least one function of speech input and gesture recognition.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 is a view illustrating a second embodiment of the vehicle control method illustrated in FIG. 3.

DETAILED DESCRIPTION

Figure 1:
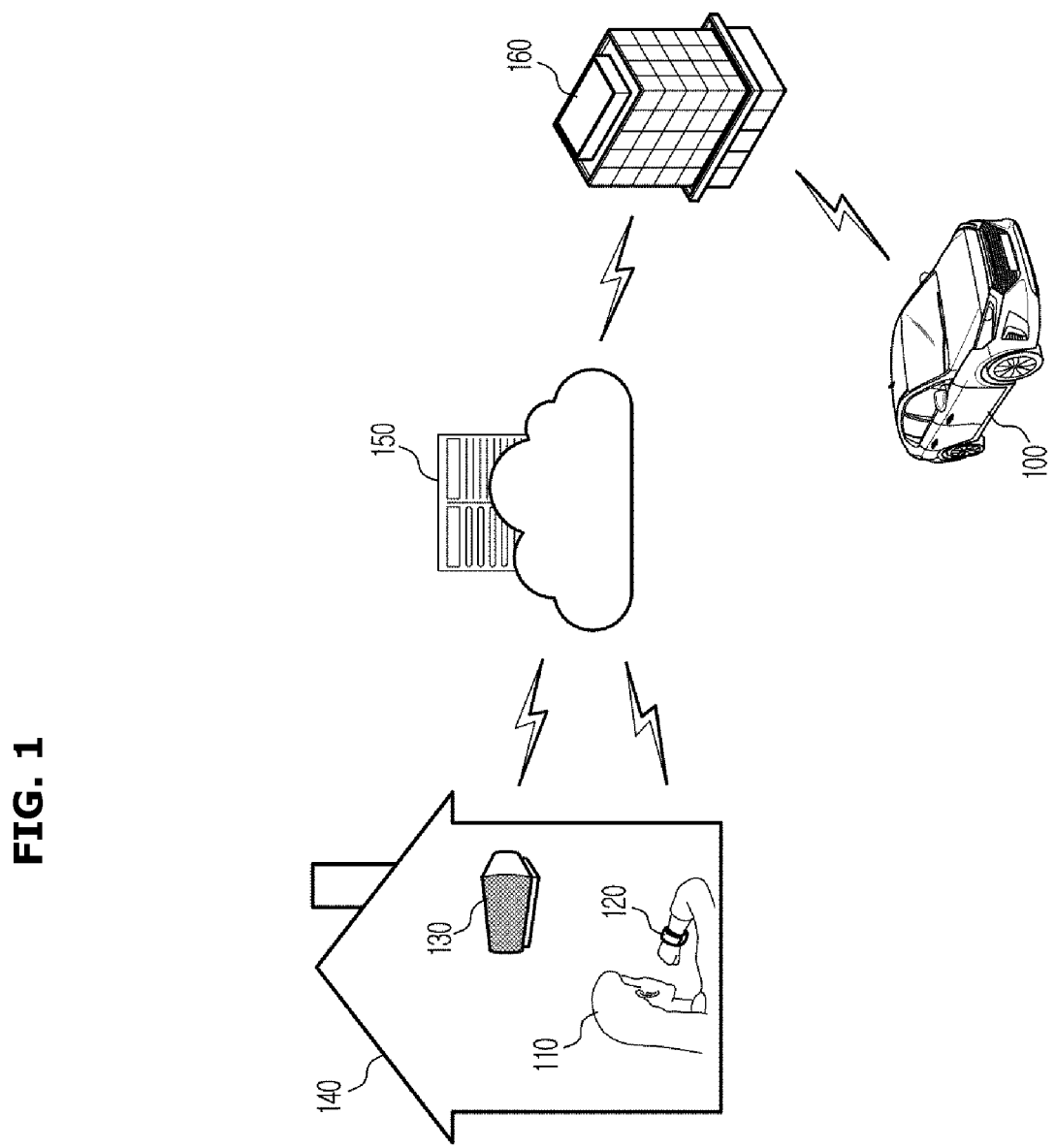
FIG. 1 is a view illustrating a speech recognition-based vehicle control system according to exemplary embodiments of the present disclosure.

FIG. 1 is a view illustrating a speech recognition based vehicle control system according to exemplary embodiments of the present disclosure.

A speech recognition secretarial service based on a home speaker 130 is provided in a residential space 140. The speech recognition secretarial service is a service in which, when a speech command is generated by a user, by a speech of a user or a speech of a user 110, the speech command of the user 110 is recognized through a speech recognition function and artificial intelligence which are provided in the home speaker 130 so that a corresponding command is performed.

For example, in a case in which an air conditioner installed in the residential space 140 is to be turned on and set to a target temperature, when the user 110 says "turn on the air conditioner and set the set temperature to 25° C.," the home speaker 130 recognizes the speech command of the user 110, turns on the air conditioner in response to the command, and sets the temperature to 25° C. In such a speech recognition secretarial service, it is assumed that home appliances in the residential space 140 and the home speaker 130 are connected through a home network to communicate with each other.

An application scope of the speech recognition secretarial service is expanding from a home application to a vehicle 100 application. That is, in a conjunction of a speech recognition secretarial service and a telematics service, a speech command generated by a speech of the user 110 is transmitted to the vehicle 100 to control the vehicle 100.

For example, in a case in which a temperature of a seat of the vehicle 100 is to be increased in advance, when the user 110 says "turn on the hot-wire seat of the vehicle," the home speaker 130 transmits the speech command of the user 110 to a telematics server 160 through an Internet of things (IoT) server 150 to control the vehicle 100.

In order for the user 110 to generate a speech recognition command as described above, user authentication is required. This is because when user authentication is not performed, an unauthorized person may use the vehicle 100 without permission. In a conventional user authentication method, for example, a password (e.g., a personal identification number (PIN) code) is spoken so that the home speaker 130 can recognize the spoken password. However, such user authentication through a direct speech of a password is risky because the password can be exposed to others.

In the control of the vehicle using the speech recognition secretarial service according to exemplary embodiments of the present disclosure, user authentication is privately performed through a device (e.g., a wearable device 120) which is worn (portable) by the user 110 without directly speaking the password. To this end, the user 110 registers the wearable device 120 in the IoT server 150 in advance so that the user authentication may be replaced by authentication of the wearable device 120 during actual use.

Figure 2:
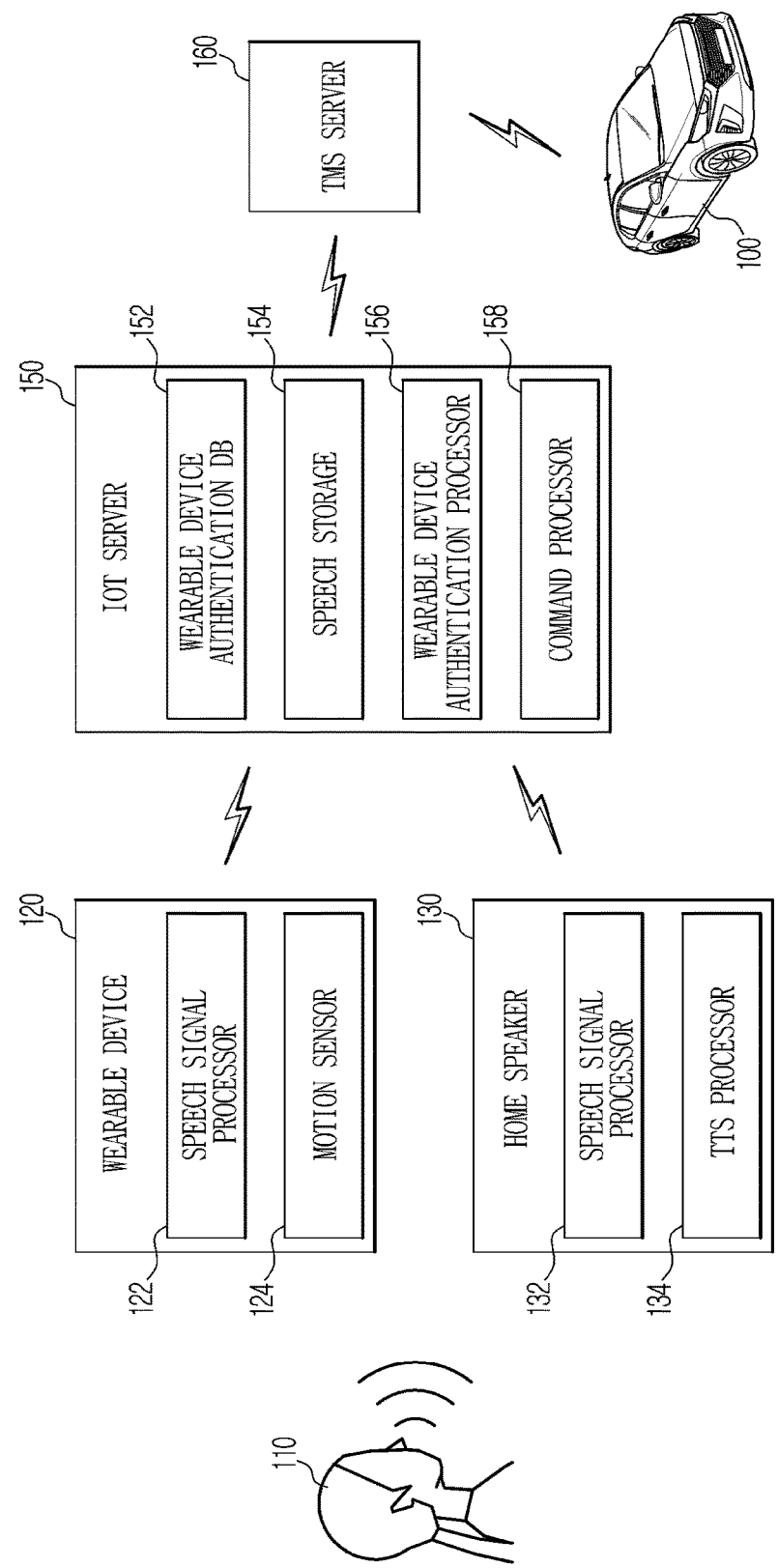
FIG. 2 is a view illustrating a specific configuration of the speech recognition-based vehicle control system of FIG. 1.

FIG. 2 is a view illustrating a specific configuration of the vehicle control system illustrated in FIG. 1.

The wearable device 120 includes a speech signal processor 122 and a motion sensor 124. The speech signal processor 122 of the wearable device 120 converts a speech signal input through a microphone (not illustrated) into an electrical signal, and then converts the electrical signal into a digital data form. The motion sensor 124 is provided to sense a gesture of the user 110. The motion sensor 124 is for sensing a motion (a gesture) of a part of the body of the user 110, such as a gyro sensor, a vision sensor, or an optical sensor. A pre-determined type of gesture event using the wearable device 120 may be a preliminary action which foretells generation of a speech command through a speech of the user 110.

The home speaker 130 is a base device of the speech recognition secretarial service. When a speech command is generated through a speech for the user 110 to use the speech recognition secretarial service, the speech command of the user 110 is recognized through a speech recognition function and artificial intelligence which are provided in the home speaker 130 so that a corresponding command is performed. To this end, the home speaker 130 includes a speech signal processor 132 and a text-to-speech (TTS) processor 134. The speech signal processor 132 of the home speaker 130 converts a speech signal input through a microphone (not illustrated) into an electrical signal, and then converts the electrical signal into a digital data form. The TTS processor 134 is provided to convert and output text data into a speech signal (TTS signal). For example, when a message in a speech form is to be output to the user 110, the TTS processor 134 converts a text of corresponding content into a signal in a human language and outputs the converted signal.

The IoT server 150 is connected to the wearable device 120, the home speaker 130, and the telematics server 160 to communicate therewith. The IoT server 150 performs speech command conversion, user authentication, and the like. The IoT server 150 includes a wearable device authentication database 152, a speech storage 154, a wearable device authentication processor 156, and a command processor 158. Information required for authentication of the wearable device 120 is stored in the wearable device authentication database 152. For example, unique information of the wearable device 120, which is input by the user 110 to register the wearable device 120 in advance, is stored in the wearable device authentication database 152. The information stored in the wearable device authentication database 152 is used for authentication of the wearable device 120 in the future. A speech command transmitted through the wearable device 120 or the home speaker 130 is stored in the speech storage 154. The wearable device authentication processor 156 performs authentication which confirms that the wearable device 120 is registered in advance on the basis of the information stored in the wearable device authentication database 152. The command processor 158 converts a speech command, which is generated by a speech of the user 110, into a text form through speech-to-text (STT) conversion.

Figure 3:
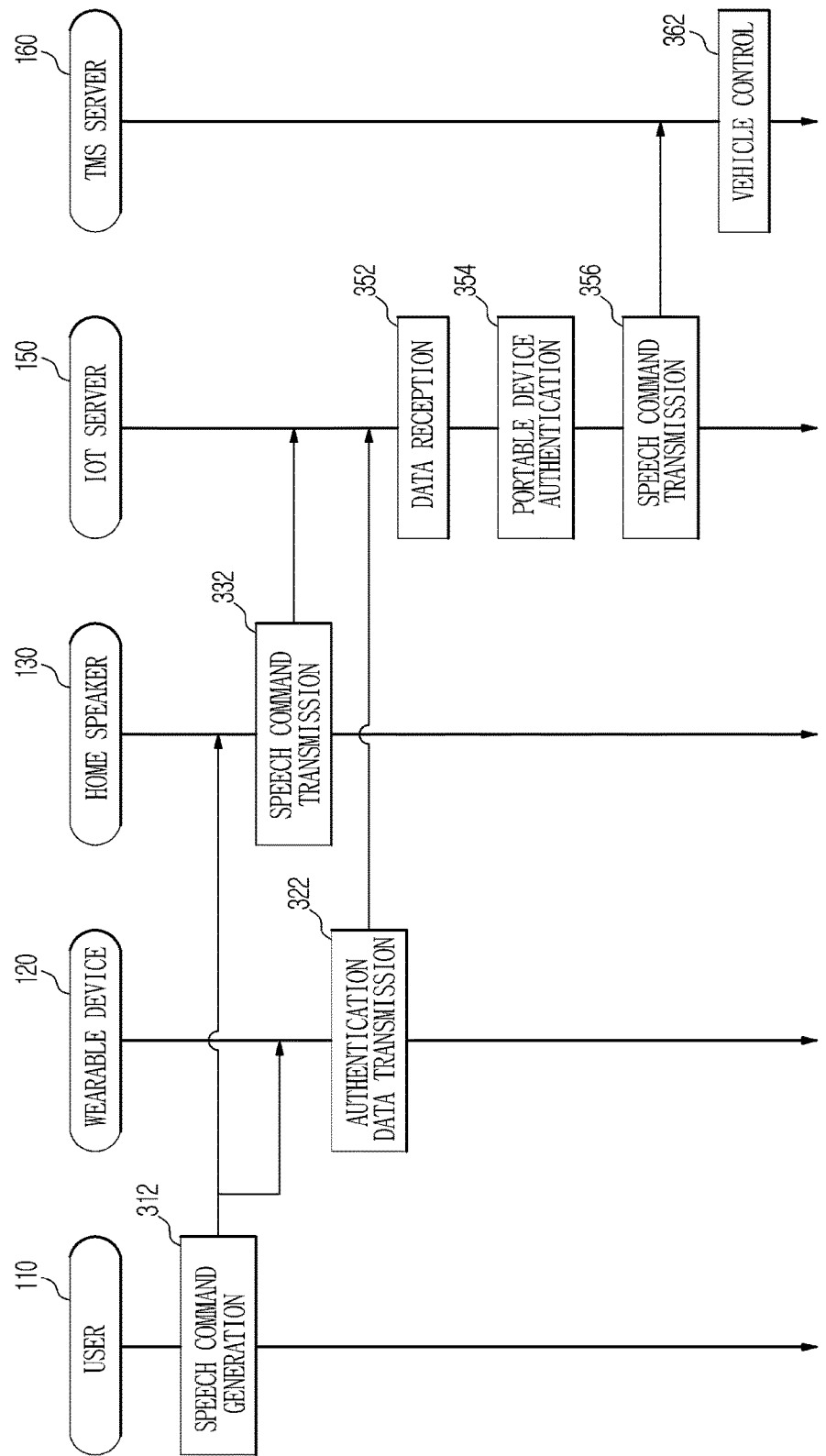
FIG. 3 is a view illustrating a speech recognition-based vehicle control method according to exemplary embodiments of the present disclosure.

FIG. 3 is a view illustrating a speech recognition based vehicle control method according to exemplary embodiments of the present disclosure.

As illustrated in FIG. 3, when a speech command is generated by the user 110 (312), the speech command is transmitted to the IoT server 150, which is a first server, through the home speaker 130, which is a speech recognition service apparatus (332), and is transmitted to the IoT server 150, which is the first server, through the wearable device 120, which is a portable device (322). The speech command transmitted through these two paths in this manner is received by the IoT server 150 (352). In the IoT server 150, authentication of the wearable device 120 is performed to determine validity of the speech command (354). When the authentication of the wearable device 120 is normally performed and the validity of the speech command is secured, the speech command is transmitted from the IoT server 150 to the telematics server 160, which is a second server, so that the vehicle 100 is controlled (362).

Figure 4:
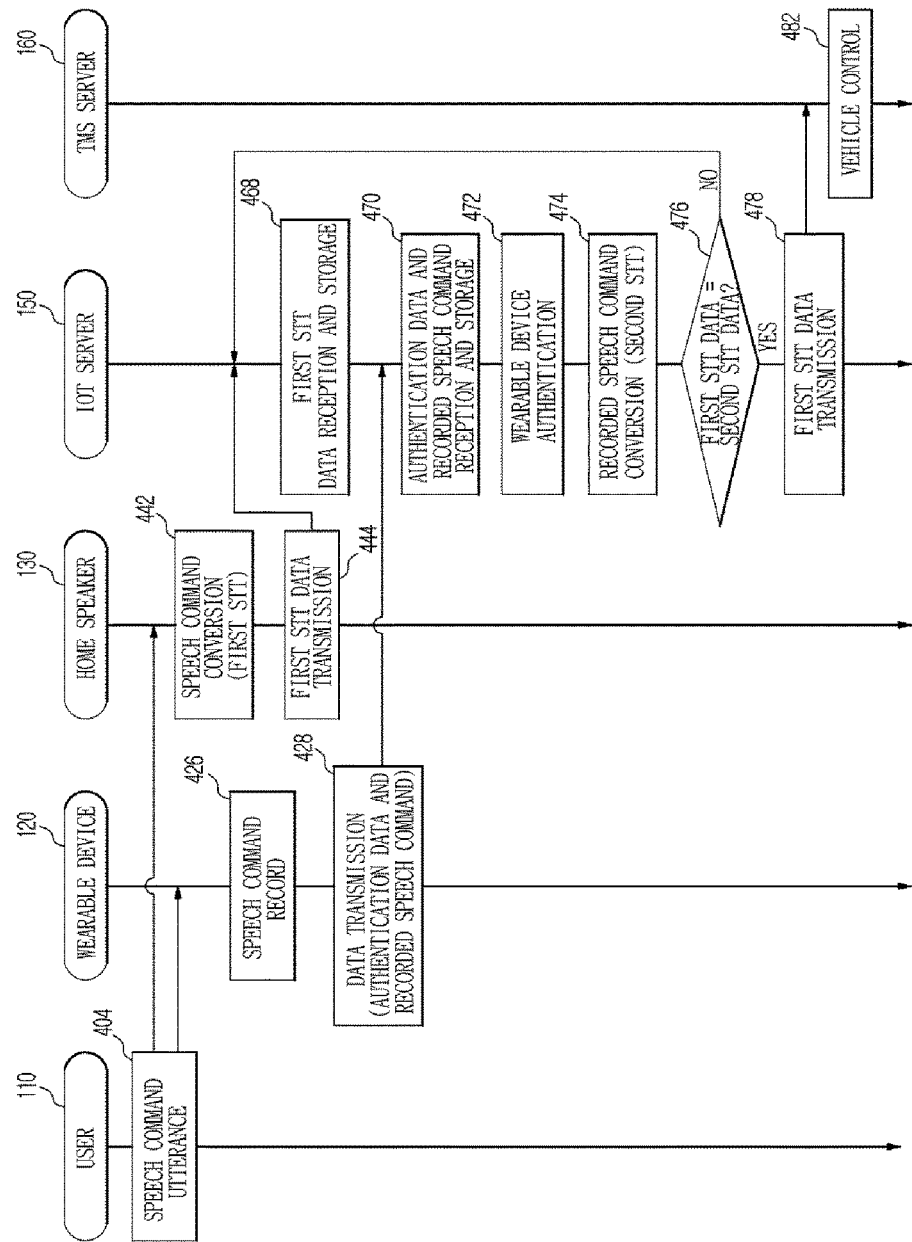
FIG. 4 is a view illustrating a first embodiment of the vehicle control method illustrated in FIG. 3.

FIG. 4 is a view illustrating a first embodiment of the vehicle control method illustrated in FIG. 3. In the first embodiment illustrated in FIG. 4, a speech command is transmitted through the wearable device 120 on which a microphone is mounted, and security authentication is performed.

The user 110 produces a speech command corresponding to a desired control command to control the vehicle 100 located at a remote location through a speech recognition secretarial service (404). The speech command spoken by the user 110 is transmitted to the wearable device 120 and the home speaker 130.

The wearable device 120 receives the speech command generated by the speech of the user 110, records the speech command, and then stores the speech command (426). In exemplary embodiments of the present disclosure, start and end points of the speech command are determined according to a magnitude (amplitude) of a speech signal which is input to the wearable device 120. For example, a magnitude (amplitude) of a speech signal at each of start and end points of a speech when a person routinely speaks one sentence is obtained through experiments and generalized, and the start point and the end point of the speech command are distinguished by the magnitude (amplitude) of the speech signal at a time of actual speech of the speech command, on the basis of results of the experiments.

The wearable device 120 transmits its own authentication data and the recorded speech command to the IoT server 150 (428). The authentication data of the wearable device 120 serves as a basis for indicating that the wearable device 120 is a reliable device registered in the IoT server 150 in advance. The IoT server 150 determines that the corresponding wearable device 120 is a reliable device registered in advance by checking the authentication data of the wearable device 120.

The home speaker 130 receives the speech command generated by the speech of the user 110 and performs STT conversion thereon (442). The STT conversion is conversion of a command in the form of a speech signal spoken by the user 110 into a text data form. That is, the speech command generated by the speech of the user 110 is converted into first text data (first STT data) through the home speaker 130. The first text data (the first STT data) generated through the conversion in the home speaker 130 is transmitted to the IoT server 150 (444).

The IoT server 150 receives and stores the first text data (the first STT data) transmitted from the home speaker 130 (468). Also, the IoT server 150 receives and stores the authentication data and the recorded speech command which have been transmitted from the wearable device 120 (470). The IoT server 150 checks that the wearable device 120 is a reliable device registered in advance through analysis of the authentication data received from the wearable device 120 to perform authentication of the wearable device 120 (472). Also, the IoT server 150 performs STT conversion on the recorded speech command received from the wearable device 120 (474). The STT conversion is a conversion of a command in the form of a speech signal spoken by the user 110 into a text data form. That is, the speech command generated by the speech of the user 110 is converted into second text data (second STT data) in the IoT server 150.

That is, a single speech command generated by the speech of the user 110 is converted into two separate pieces of text data (first STT data and a second STT data) in the home speaker 130 and the IoT server 150. Since the first text data (the first STT data) and the second text data (the second STT data) are separate pieces of text data but are generated from a single speech command, the first text data (the first STT data) and the second text data (the second STT data) should be identical in a normal case.

The IoT server 150 compares and determines whether the first text data (the first STT data) generated through a path via the home speaker 130 and the second text data (the second STT data) generated through a path via the wearable device 120 are identical (476).

As described above, since the first text data (the first STT data) and the second text data (the second STT data) are generated from a single speech command, their content (meanings) should be identical. Therefore, when the first text data (the first STT data) and the second text data (the second STT data) are identical (YES in 476), the IoT server 150 transmits the first text data (the first STT data) to the telematics server 160 so that the speech command may be transmitted to the vehicle 100 through the telematics server 160 (478). In this case, the second text data (the second STT data) may be transmitted to the telematics server 160 instead of the first text data (the first STT data) (478). Since the first text data (the first STT data) and the second text data (the second STT data) are determined to be identical, control may be normally performed even when any one of the first text data (the first STT data) and the second text data (the second STT data) is transmitted to the telematics server 160.

The telematics server 160 receives the first text data (the first STT data) (or the second text data (the second STT data)) transmitted from the IoT server 150 and transmits a corresponding control command to the vehicle 100 so that the control of the vehicle 100 corresponding to the speech command generated by the speech of the user 110 may be performed.

In this way, when generating the speech command through the home speaker 130, the user 110 does not directly speak a separate password (e.g., a PIN code) and user authentication is performed through the wearable device 120 such that the password is not exposed to the outside. Therefore, security of the speech command system may be maintained at a high level.

FIG. 5 is a view illustrating a second embodiment of the vehicle control method illustrated in FIG. 3. In the second embodiment illustrated in FIG. 5, when the wearable device 120 does not have a microphone, a gesture event occurs through the wearable device 120 and security authentication is performed.

The user 110 generates a motion while wearing the wearable device 120 such that a predetermined gesture event occurs (502). For example, when it is predetermined that three short shakes of the wearable device 120 is a gesture for generating a speech command, the user 110 may shortly shake the wearable device 120 three times to foretell generation of the speech command. It is assumed that the wearable device 120 includes a motion sensor such as a gyro sensor for such an occurrence of the gesture event. The gesture event may occur by sensing a motion of a part of the body of the user 110 through a vision sensor, an optical sensor, or the like instead of the gyro sensor.

After the gesture event using the wearable device 120 occurs, the user 110 produces a speech command corresponding to a desired control command to control the vehicle 100 located at a remote location through a speech recognition secretarial service (504). The speech command produced by the user 110 is transmitted to the home speaker 130.

The wearable device 120 transmits its own the authentication data and gesture event data to the IoT server 150 in response to the occurrence of the gesture event (528). The authentication data of the wearable device 120 serves as a basis for indicating that the wearable device 120 is a reliable device registered in the IoT server 150 in advance. The IoT server 150 determines that the corresponding wearable device 120 is a reliable device registered in advance by checking the authentication data of the wearable device 120.

The home speaker 130 receives the speech command generated by the speech of the user 110 and performs STT conversion thereon (542). The STT conversion is a conversion of a command in the form of a speech signal spoken by the user 110 into a text data form. That is, the speech command generated by the speech of the user 110 is converted into text data (STT data) through the home speaker 130. The text data (STT data) generated through the conversion in the home speaker 130 is transmitted to the IoT server 150(544).

The IoT server 150 receives and stores the authentication data and the gesture event data which are transmitted from the wearable device 120 (560). The IoT server 150 checks that the wearable device 120 is a reliable device registered in advance through analysis of the authentication data received from the wearable device 120 to perform authentication of the wearable device 120 (562). Also, the IoT server 150 receives and analysis the gesture event data transmitted from the wearable device 120 and checks that the corresponding gesture event foretells the generation of a speech command.

The generation of the speech command has been described as being foretold by a gesture event occurring through the wearable device 120. In the embodiment of the present disclosure, after the gesture event which foretells the generation of the speech command occurs through the wearable device 120, only a speech signal input within a preset time is recognized as a valid speech command. For example, only a speech signal input within ten seconds after the occurrence of the gesture event through the wearable device 120 is recognized as a valid speech command. Such a time limit is to prevent a situation in which an indefinite wait for speech command input occurs.

When a speech command is received within the preset time after the occurrence of the gesture event through the wearable device 120 (YES in 564), the IoT server 150 receives and stores the text data (STT data) transmitted from the home speaker 130, and then transmits the text data (STT data) to the telematics server 160 so that the speech command may be transmitted to the vehicle 100 through the telematics server 160 (568).

The telematics server 160 receives the text data (STT data) transmitted from the IoT server 150 and transmits a corresponding control command to the vehicle 100 so that the control of the vehicle 100 corresponding to the speech command generated by the speech of the user 110 may be performed.

In this way, when generating the speech command through the home speaker 130, the user 110 does not directly speak a separate password (e.g., a PIN code) and user authentication is performed through the wearable device 120 so that another person cannot easily recognize the password. Therefore, security of the speech command system may be maintained at a high level.

According to exemplary embodiments of the present disclosure, user authentication can be privately performed through a portable device (e.g., a wearable device) of a user without directly speaking information for authentication (e.g., a password or a PIN code) in a speech form, and security when the user authentication is performed can be sufficiently ensured.

The above description is only an example describing the technological scope of the present disclosure. Various changes, modifications, and replacements may be made thereto without departing from the spirit and scope of the present disclosure by those skilled in the field of medical devices. Therefore, the exemplary embodiments disclosed above and in the accompanying drawings should be considered in a descriptive sense only and not for limiting the technological scope. The technological scope of the present disclosure is not limited by these embodiments or the accompanying drawings. The spirit and scope of the present disclosure should be interpreted with regard to the appended claims and encompass all equivalents falling within the scope of the appended claims.

What is claimed is:

1. A vehicle control method, the method comprising:
detecting a gesture event in a portable device;
transmitting a speech command to a first server through a first path via a speech recognition service apparatus in response to the occurrence of the gesture event;
transmitting authentication data of the portable device and the speech command to the first server through a second path via the portable device in response to the occurrence of the gesture event; and
performing, by the first server, authentication of the portable device on the basis of the authentication data, and recognizing the speech command as a valid speech command when the authentication of the portable device is completed.

2. The method according to claim 1, further comprising comparing the speech command transmitted through the first path and the speech command transmitted through the second path to determine validity of the speech command, and determining whether the speech commands are identical.

3. The method according to claim 1, further comprising transmitting the speech command to the second server when the speech command is determined to be valid so that control corresponding to the speech command is performed.

4. The method according to claim 3, wherein:
the second server is a telematics server; and
the control through the speech command is for controlling a vehicle registered in the telematics server.

5. The method according to claim 1, wherein the speech recognition service apparatus is an Internet of things (IoT) device for providing a speech recognition secretarial service.

6. The method according to claim 1, wherein the portable device is a wearable device having at least one function of speech input and gesture recognition.

7. A speech recognition method, the method comprising:
detecting a gesture event in a portable device;
transmitting a speech command to a first server through a first path via a speech recognition service apparatus in response to the occurrence of the gesture event;
transmitting authentication data of the portable device and gesture event data to the first server through a second path via the portable device in response to the occurrence of the gesture event; and
performing, by the first server, authentication of the portable device on the basis of the authentication data, and recognizing the speech command as a valid speech command when the authentication of the portable device is completed.

8. The method according to claim 7, wherein only a speech signal input within a preset time after the occurrence of the gesture event is recognized as a speech command.

9. The method according to claim 7, wherein a motion of a part of a body of a user of the portable device is sensed through a motion sensor to detect that the gesture event occurred.

10. The method according to claim 9, wherein the motion sensor is at least one of a gyro sensor, a vision sensor and an optical sensor, which are provided to sense the motion of the part of the body of the user.

11. The method according to claim 7, further comprising transmitting the speech command to the second server when the speech command is determined to be valid so that a control corresponding to the speech command is performed.

12. The method according to claim 11, wherein:
the second server is a telematics server; and
the control through the speech command controls a vehicle registered in the telematics server.

13. The method according to claim 7, wherein the speech recognition service apparatus is an Internet of things (IoT) device for providing a speech recognition secretarial service.

14. The method according to claim 7, wherein the portable device is a wearable device having at least one function of speech input and gesture recognition.

* * * * *